United States Patent [19]
Maddy

[11] Patent Number: 4,863,661
[45] Date of Patent: Sep. 5, 1989

[54] RESIN MOLDING PROCESS EMPLOYING A MICKEL-BASED ALLOY LINER

[75] Inventor: Woodrow D. Maddy, Dublin, Va.

[73] Assignee: Xaloy, Inc., Pulaski, Va.

[21] Appl. No.: 226,547

[22] Filed: Jul. 29, 1988

Related U.S. Application Data

[63] Continuation of Ser. No. 899,934, Aug. 25, 1986, abandoned.

[51] Int. Cl.⁴ .......................... B27J 5/00; B28D 7/36
[52] U.S. Cl. ................................... 264/127; 264/39; 264/169; 264/338; 249/116; 249/135
[58] Field of Search ................. 264/39, 169, 338, 127; 249/114.1, 116.135; 425/462, 467

[56] References Cited

U.S. PATENT DOCUMENTS

| | | | |
|---|---|---|---|
| 3,248,788 | 5/1966 | Goldstein et al. | 29/527.2 |
| 3,408,728 | 11/1968 | Fickett et al. | 228/243 |
| 3,836,341 | 9/1974 | Saltzman et al. | 164/114 |
| 4,471,034 | 9/1984 | Romero et al. | 249/135 |
| 4,484,883 | 11/1984 | Honda et al. | 425/467 |
| 4,623,087 | 11/1986 | Conolly | 29/527.2 |

FOREIGN PATENT DOCUMENTS

| | | | |
|---|---|---|---|
| 59-136473 | 8/1984 | Japan | 420/442 |
| 785416 | 10/1957 | United Kingdom | 420/441 |

Primary Examiner—Richard K. Seidel
Attorney, Agent, or Firm—Ostrolenk, Faber, Gerb & Soffen

[57] ABSTRACT

A method of producing cylindrical objects with one or more lobes in which the bore surfaces are completely protected by a surface layer of abrasion resistant and/or corrosion resistant alloy and which protective layer is free of any contamination by the metal of the substrate. A hard, wear resistant, and corrosion resistant nickel-based alloy is especially suitable as lining material for surface of cylindrical products, such as housings or shells used in extrusion and injection molding devices for processing halogenated resins or rubbers. The alloys will preferably also contain 0.5 to 5% silicon and 1 to 4% boron. Also disclosed is a method of producing cylindrical objects with one or more lobes in which the bore surfaces are completely protected by a surface layer of abrasion resistant and/or corrosion resistant alloy, such as the above-described metal-based alloy.

11 Claims, 2 Drawing Sheets

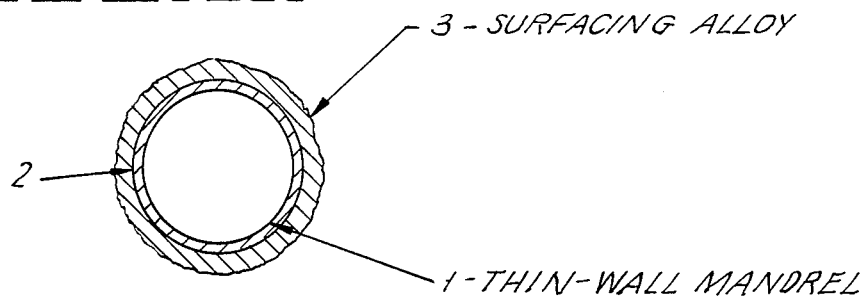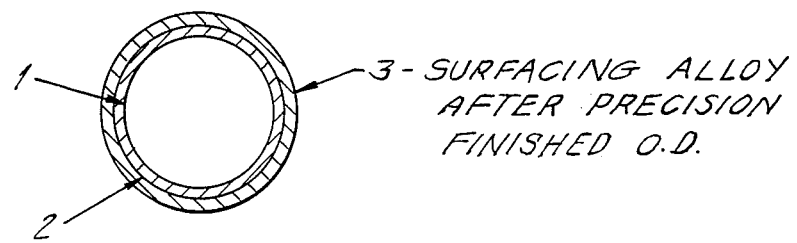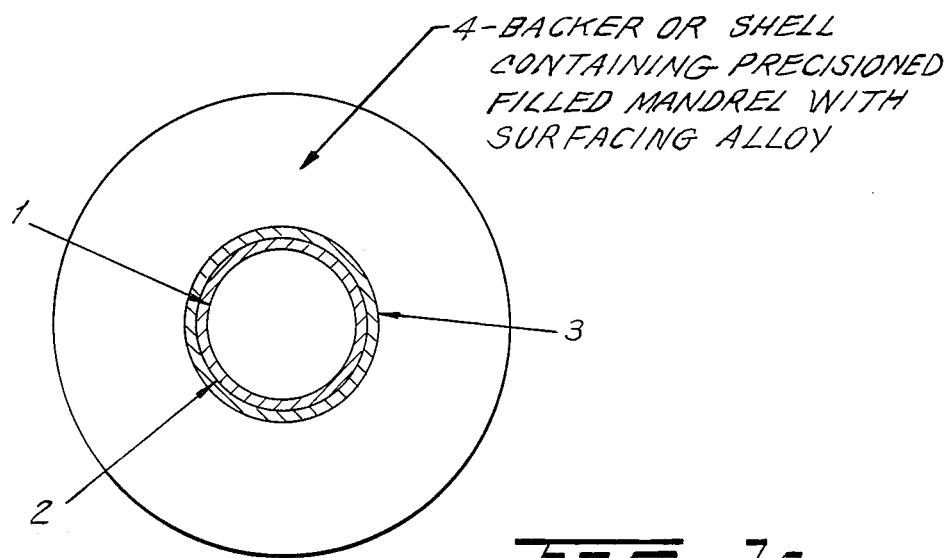

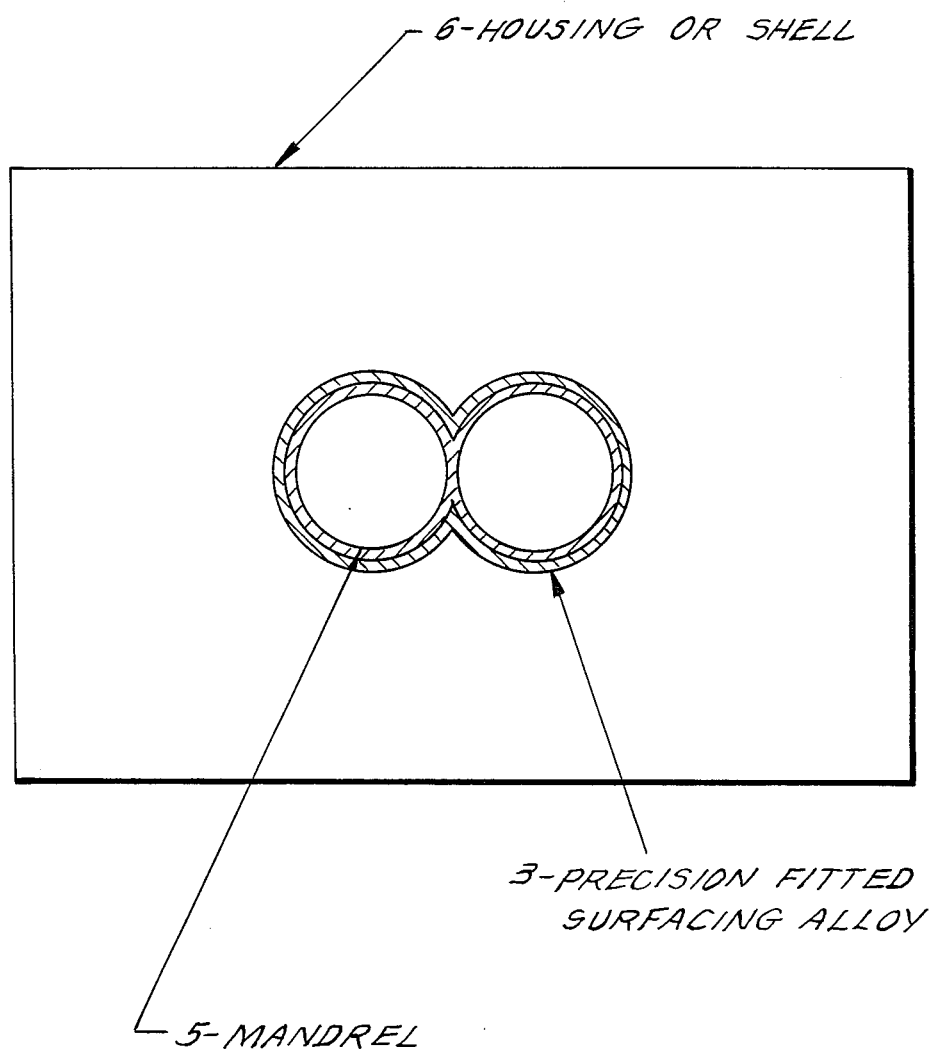

RESIN MOLDING PROCESS EMPLOYING A MICKEL-BASED ALLOY LINER

This application is a continuation of application Ser. No. 899,934, filed Aug. 25, 1986, now abandoned.

BACKGROUND OF THE INVENTION

There are several shortcomings to cylindrical products in which the bore surfaces are protected against abrasion and/or corrosion by the traditional method of centrifugal casting. In the traditional method a backer cylinder or liner shell is machined with the bore diameter oversized by one-eighth ($\frac{1}{8}$) to one-fourth ($\frac{1}{4}$) inch, the surfacing alloy in powdered form and in sufficient quantity to produce the desired surface layer thickness is distributed along the bore length, the ends are capped, and then the assembly is slowly rotated while being heated to a temperature above the melting point of the surfacing alloy, at which time the assembly is rapidly rotated while being externally cooled. The backer cylinder or liner shell is most often steel and the surfacing alloys most often iron-nickel-boron-carbon for abrasion resistance, nickel-cobalt-boron-silicon for corrosion resistance, or nickel-boron-silicon-tungsten carbide for both abrasion and corrosion resistance. If multi-lobed cylindrical products are required with protected bore surfaces, they are traditionally made by first centrifugally casting the surface alloy into the required number of single cylinders, slicing these lengthwise to provide the individual lobe shapes, and fusion welding the individual cylinders to form the multi-lobed product.

These methods include:

U.S. Pat. No. 4,596,282 describes injection molding and extrusion as processes currently employed for forming articles from plastics, wherein a heated fused plastic is forced under pressure into a mold cavity to solidify in the shape and size of the cavity. The charge of plastic material to be injected into the mold cavity must be heated and pressurized prior to injection, and in one approach, the plastic starting material is fed into a hollow cylinder having a screw therethrough. As the screw turns, the plastics forced into a heated zone of the cylinder ahead of a check ring on the head of the screw, so that a predetermined volume of heated, pressurized plastic is prepared for subsequent injection into the mold cavity by a forward movement of the screw and check ring within the cylinder.

Because the economic of injection molding depends upon attainment of long operation lives for the machinery, it is important that the inner lining of the cylinder have a high resistance to wear and corrosion by the heated plastic material. Should the inside of the cylinder wear away so that the inner diameter of the cylinder is enlarged, a clearance develops between the check ring and screw, and the inner wall of the cylinder so that the plastic material leaks back from the pressurized zone, with the result that the necessary pressure for injection molding will not be developed. The cylinder must then be refurbished or replaced, or a larger diameter check ring must be utilized and, in any event, the economic production process is interrupted.

As set forth in U.S. Pat. No. 3,836,341, extruder barrels and injection molding machine cylinders have frequently been cast in recent years with high-ferrous content alloy linings. These prior ferrous alloy linings typically have ambient temperature hardness in the range of 58–64 Rockwell C in other centrifugally cast state. While such high ferrous content linings demonstrate excellent wear resistance to abrasive fillers present in plastic compositions during extrusion or molding operations, some such linings have relatively poor corrosion-resistant qualities, especially under conditions which cause the plastic material being processed to partially decompose.

Some of the disadvantages of these methods include:

(1) The surfacing alloy must have a melting temperature substantially below that of the backer shell. This severely limits the choice of surfacing alloys.

(2) The slow melting and long time for solidification of the surfacing alloy results in significant dissolution of the metal of the backer or shell and diffusion of this metal into the surface alloy. Since the shell is usually steel, this results in significant iron contamination of the surfacing alloy. In many cases the corrosion resistance of the surface is severely impaired and in some cases, such as in cylinders used for extrusion of fluoropolymers, unacceptable degradation of the polymer occurs.

(3) In the case of multi-lobed cylinders, the weld can only be made in the backer metal and can only approach but not get too close to the surfacing alloy in order to avoid cracking and spalling of the surfacing layer. This results in a gap between the two or more lobes which gap extends into the substrate metal. This allows the product being processed to penetrate the gap causing abrasion, corrosion, and product degradation.

Another special problem arises because the corrosion-resistant problem associated with high ferrous content alloy linings is particularly acute when the resin feed contains halogenated polymers or copolymers, such as fluorocarbon resins. As a result of feed degradation, which is difficult, if not impossible, to control fully the extrudate in a relatively short period of time become contaminated with minute metallic particles. These metallic particles come from the corrosive attack on the barrel lining alloy and become dislodged from the lining and migrate into the extrudate during processing. The corrosive agents are believed to be the halogens and possibly other gaseous substances formed during injection molding and extrusion.

Although nickel ingredients have been employed in varying amounts in liner alloys (see, for example, U.S. Pat. No., 3,836,341) the prior art disclosures utilized it in conjunction with substantial amounts of iron and special ingredients such as the tungsten carbide. In short, the problem is that high ferrous content liner alloys have been known to be undesirable in corrosive atmospheres, while the non-ferrous alloys proposed heretofore which exhibit satisfactory corrosion resistance, are not as wear and abrasive resistant as the high ferrous content alloys linings. Moreover, the use of special and additional ingredients such as tungsten carbide can be too costly for certain commercial applications. Nickel-based alloys often lack the requisite hardness.

One object of the present invention is to provide a method for attaining bore surface protection of cylindrical products while avoiding the difficulties or shortcomings of the previous methods.

A further object of the present invention is to provide an essentially non-ferrous alloy which is suitable as a liner for injection molding or extrusion cylinders and which is particularly adaptable for use in the surface protecting method of the inventor.

Another object is to provide a nickel-based lining alloy with improved hardness, wear resistant and corrosion resistant characteristics.

A still further object is to provide a method of lining the inner diameter of a steel housing with a nickel-based alloy, said lined steel housing being employed as a cylindrical barrel in extrusion and injection molding devices.

These and other objects of the present invention will become apparent from the ensuing description and embodiments.

SUMMARY OF THE INVENTION

In accordance with the surfacing method of this invention, a suitable alloy is placed in the form of fine powder onto the external surface of a tubular mandrel whose external shape is approximately the internal shape of the final object, inserting the surface mandrel into the liner shell or housing, and hot-isotatic pressing the surfacing layer into the inner surface of the shell or housing. The mandrel is then removed and the object finished to shape.

In accordance with another aspect of the present invention, it has been found that a particular nickel-based alloy, which contains a maximum of 1% by weight of iron, can be effectively used as a liner alloy for bimetallic cylinders of extrusion and injection molding devices. These nickel-based alloys will contain at least 90% of nickel, up to 0.4% carbon, up to 1% iron, from 0.5% to 5% silicon, from 1% to 4% boron. All percentages are by weight unless otherwise specified, and the amount of nickel will always be used in amounts to bring the formulations to 100%. It will be further understood that the expression "up to" is intended to encompass zero percent of the indicated component or ingredient. Moreover, the present invention is intended to cover nickel-based alloy formulations containing up to 10% chromium as well as phosphorous and sulfur impurities in amounts up to 0.05%.

The alloys of the present invention only have improved corrosion resistance as compared to ferrous-based lining alloys but also have an unusually high hardness value for nickel-based alloys. Thus, it was found that the preferred alloys of the present invention are characterized by hardness value ranging from about 55 Rockwell C.

According to still another feature of the present invention, these nickel-based alloys, containing a maximum of 1% iron, are employed as wear resistant and corrosion resistant liners for various devices requiring hard, wear resistant and corrosion resistant material contacting surfaces. Thus, for example, such linings may be formed on either the interior or exterior surfaces of cylindrical ferrous metal shells or housings and the desired devices fabricated therefrom. The lining of the interior of tubular steel housing utilized in extrusion and injection molding devices is an especially preferred use of the nickel-based alloys of the present invention.

BRIEF DESCRIPTION OF THE DRAWINGS

FIG. 1a is a transverse cross-section of a thin-walled mandrel (1) upon the outside or outer diameter (O.D.) (2) of which the surfacing alloy (3) has been placed by, for example, flame spray (M.S.).

FIG. 1b is the surfaced mandrel (3) of FIG. 1a after the O.D. (2) has been finished in order to make a precision sliding fit into the backer or shell.

FIG. 1c shows the surfaced and finished mandrel (3) positioned into its backer or shell (4).

FIG. 2 is a transverse cross-section of a twin-lobed mandrel (5) upon the O.D. of which the surfacing alloy (3) has been placed, the O.D. surfaces precision machined, and the surface mandrel (5) fitted into a housing or shell (6).

DETAILED DESCRIPTION OF THE INVENTION AND PREFERRED EMBODIMENTS

In general, the method of the invention, expressed in its simplest form, will comprise the following steps:

1. A thin-walled mandrel of plain carbon steel is made such that the O.D. of the mandrel is slightly smaller than the desired final I.D. (Inside Diameter) of the surfaced cylinder. The amount smaller will be sufficient to accommodate mandrel expansion during surface alloy consolidation upon HIPping plus the amount of finish stock desired on the bore surface.

2. The surfacing alloy powder is applied to the O.D. of the mandrel by any of a variety of methods which cause the powder to remain in place during subsequent steps. FIG. 1a. Preferably this is done by a flame spray or high velocity impact because these methods retain more of the fine particle size and unique microstructural features of the starting powder than do melt application processes such as PTA.

3. The rough O.D. surface of the coated mandrel is precision machined or ground to a dimension which after HIPping will yield the desired thickness of surface alloy, including allowance for final bore finishing. FIG. 1b.

4. The shell, housing, backer or casing is machined in its I.D. just enough larger than the O.D. of the surfaced mandrel so that a sliding fit can be made.

5. All surfaces are cleaned and the mandrel inserted into the outer piece. FIG. 1c.

6. A thin metal annular disc (not shown) is welded at each end of the cylinder to the mandrel and the housing to seal the space containing the surfacing alloy. These end flanges are most readily welded onto the mandrel during mandrel fabrication. One end seal should contain an evacuation tube (not shown).

7. The air is evacuated from the space containing the surfacing alloy, the tube pinch welded, and subsequently fusion welded to maintain the vacuum.

8. The assembly is placed in a pressure vessel (not shown) and subjected to heating and pressure. The temperature, time and pressure are sufficient to move the mandrel radially outward, consolidating the powdered surfacing alloy and bonding it to the bore of the shell or housing; but the temperature and time are minimal to avoid melting the surfacing alloy, causing grain growth in the surfacing alloy, or causing measurable diffusion of shell or housing metal atoms into the surfacing alloy. The precision fit of the surfaced mandrel into the shell or housing, and the partial densification of the surfacing alloy powder during preplacement greatly minimizes the radial movements during HIPping and results in high accuracy of as-processed dimensions.

9. After removal from the HIP vessel, the end seals and mandrel are removed by simple machining or acid dissolution.

10. Final dimensions are attained by machining, grinding, or honing The high as-processed dimensional accuracy minimizes necessary finishing steps and costs.

The advantages of this particular method for making multi-lobed cylinders will now be obvious. Instead of cutting and welding multiple bore-surfaced single cylinders, it is the mandrel which is fabricated, surfaced over its entirety, and precision-fitted into the housing or shell as in FIG. 2. After sealing the ends and evacuating, the assembly is HIPped as described above. Because of partial densification of the surfacing powders and the precision fitting into the housing, movement during HIPping is minimal and high dimensional accuracy can be obtained. Finishing steps and costs are minimized. No gaps in the surface protection occur.

Thus, the essential features of this surfacing method are two-fold, namely (1) the preplacement and partial densification of the surfacing alloy powders to yield complete protection of the surface and a precision shape, and (2) the use of hot isostatic pressing rather than melting to complete consolidation of the surfacing alloy thereby avoiding structured change and compositional contamination of the surfacing alloy. Within these guidelines there are numerous variances possible in each step of the process, some of which will now be discussed.

The mandrel will most likely be a thin walled tube of mild steel because such can be readily deformed at low HIP temperatures and is easily removed after HIPping by machining or acid dissolution. However, heavier walled mandrels may be required if the surfacing powders are to be applied by fusion processes such as weld overlay or PTA. Mandrels of other metals may be used for special reasons; for example, nickel might be used if absolutely no iron contamination is required. Solid, rather than tubular, mandrels might be used if the bore shape is complex or extra rigidity is needed; the solid mandrel might then be bored out to provide the cavity for HPping radially outward into the surrounding housing or shell. It is possible to make irregular-shaped bores, for example grooved bores, by incorporating the reverse shape in the mandrel. A further modification of this invention is conceived as utilizing a solid mandrel, preplacing the surfacing powders thereon, inserting the surfaced mandrel into a much larger thin walled tubes or envelope, filling the space between mandrel and can with metal powders, and HIPping to form both surfacing and housing simultaneously by metal consolidation inward against the solid mandrel.

The placement of the surfacing alloy powders upon the mandrel may be done by any one of several ways. The most desirable methods use low temperature flame spray or high velocity impact, so as to minimize melting and microstructured change in the powder particles, thus retaining maximum properties in the final surface layer. However, powders may also be placed upon the mandrel by any of the usual methods such as weld overlay, PTA or even casting a liquid alloy around the mandrel while in a mold.

The surfacing alloy powders may be chosen from the usual alloys employed for abrasion and/or corrosion protection. These include such alloys as described in, for example, U.S. Pat. Nos. 3,658,515 and 3,836,341. These traditional surfacing powders were developed for application by fusion processes such as weld overlay or centrifugal casting and notably relatively low melting temperature to facilitate application.

However, in this invention, non-traditional alloy powders can be used and it is not intended that the invention be limited to the compositions named above. Examples of other alloys for use in this invention are (Composition of Tribaloy 800, Hastelloy C276) and composites such as Hastelloy C276 with addition of titanium carbide powders or composites of heat treatable tool steel matrix with titanium of tungsten carbide powders. The only limitation upon choice of surfacing alloy is that it must be capable of preplacement upon the external surface of the mandrel.

As previously indicated, another aspect of the present invention has been the discovery that certain nickel-based alloys have been found to be especially useful in the above-described method. These nickel-based alloys are especially useful as lining alloys for extrusion and injection molding cylinders for the plastics and rubber industries. The use of this alloy is essential when extruding or injection molding halogenated polymers and copolymers, e.g. fluorohydrocarbons, which are apt to degrade during processing and create a highly corrosive environment. It has been found that the iron content of the nickel-based alloy must not exceed 1%, since iron tends to promote the degradation of halogenated resins. The resulting corrosive atmosphere attacks the conventional liner materials and alloys with the result that minute metallic particles end up in the extrudate and contaminate the final extruded or injection molded products.

In general, the nickel-based alloy will be formulated from the following ingredients.

|  | Wt. % |
| --- | --- |
| Carbon | 0–0.4 |
| Iron | 0–1.0 |
| Chromium | 0–10.0 |
| Silicon | 0.5–5.0 |
| Boron | 1.0–4.0 |
| Nickel, Balance to 100% | |

The alloy may also contain minor amounts of phosphorus and sulphur impurities.

The especially preferred alloy formulation of the invention is composed as follows:

|  | Wt. % |
| --- | --- |
| Carbon | 0.25–0.3 |
| Iron | 0.82 |
| Silicon | 4.60 |
| Boron | 3.35 |
| Nickel, Balance to 100% | |

In addition to the outstanding wear resistant and corrosion resistant characteristics it was found that the nickel-based alloys of the invention had superior hardness values. More particularly, they had a hardness of from about 55 to 62 Rockwell C, which is higher values usually found in alloys conventionally used in cylinders or barrels for extruding or injection molding fluoroplastics and other corrosive resins. Thus, Hastalloy C 276 (which is an alloy composed of 1.0% manganese, 0.08% silicon, 15.5% chromium, 2.5% cobalt, 16% molybdenum, 4% tungsten, 5% iron, 0.02% carbon, balance nickel) had a hardness of 28 to 32 Rockwell C, while Xaloy 306 (which is an alloy typically composed of 1.0% manganese, 1.5% silicon, 3% boron, 7% chromium, 12% iron, 32% nickel, 0.35% carbon, balance cobalt) had a hardness of 48 to 52 Rockwell C.

There are indications that the essential features of the nickel-based liner alloys of this invention are a maximum iron content of 1% in conjunction with at least 80% nickel, preferably from about 80 to 95% nickel. These features and the controlled use of other ingredients in the alloy formulation distinguish the inventive alloys from the prior art nickel-based alloy disclosures as represented by U.S. Pat. Nos. 3,341,337 and 4,528,247. Moreover, neither of these prior art patents is concerned with designing nickel-based alloys that are especially useful as liners for extrusion or injection molding bimetallic cylinders, particularly when such extrusions and injection molding devices are employed for processing halogenated resins or sulphers where degradation of the feed that inevitably occurs leads to a corrosive atmosphere.

The lined extrusion or injection molding cylinder or barrel of the invention will generally have an internal nickel-based alloy liner ranging in thickness from about 0.030 to 0.250 inch, preferably from about 0.050 to 0.065 inch. In order to accommodate this liner, the inside diameter of the ferrous or steel cylinder or housing is pre-bored so that it is from 0.1 to 0.5 inch wider than the desired final diameter size.

On the other hand, the thickness of the alloy surface layer applied to the mandrel will depend on several factors. Rough surfaced layers will require greater thickness to finish machine to a smooth surface. More porous layers will require greater thickness to allow for thinning during HIP consolidation.

The HIP conditions of temperature, pressure and time will depend on the surfacing alloy and the housing or shell allow. The temperature necessary to consolidate most ordinary alloy powders are well known in the HIP industry. But the traditional surfacing alloy powders, having relatively low melting temperature, can be HIPped at somewhat lower temperatures than ordinary alloy powders. For example, most nickel-based alloys are HIPped at 1850° F. and above, but the above-described alloy of nickel with 4% silicon and 3% boron can be HIPped at 1750° F. In general, it is preferred to use as low a HIP temperature as will consolidate the surfacing powders and bond the surfacing layer to the substrate housing or shell. By doing this, diffusion of metal-atoms from the substrate and the mandrel into the surface layer will be negligible and contamination of the surfacing layer minimized.

After HIPping the mandrel can be removed in several ways. Most simply is by machining. However, in cases of irregular-shaped bores, such as a grooved, multi-lobed bore, acid dissolution may be used in this case, the housing or shell might be a corrosion resistant alloy or, if not, the housing or shell would be masked from contact with the dissolution fluid.

The reference will be more fully understood by reference to the embodiments set forth below. Unless otherwise specified, all percentages are by weight.

EXAMPLE 1

An extruder barrel 1.499" I.D.×3.499" O.D.×41.750" long was manufactured using the present invention. A tubular steel mandrel was made with walls 0 350" thick and ground 0.050" undersize on O.D. A nickel-based alloy powder containing 0.051% carbon, 6.56% chromium, 0.2% iron, 4.36% silicon, and 3.35% boron and with particle sizes 88% between 325 and 200 mash size was applied to the mandrel by a hydrogen-oxygen-nitrogen thermal spray system. Applied thickness was 0.080" which was ground to 0.050" O.D. using only water as a grinding fluid. Residual water was removed by oven baking at 200° F. The coated mandrel was inserted into a 4140 steel housing of 1.609" I.D., end-sealed and evacuated. The assembly was pressurized to 15,000 psi and heated to 1750° F. for three hours at temperature. After removal of the can by machining and finish machining, the sample melted from the bore surface showed 0.27% iron. The hardness of the bore surface was $Rc_{62}$ the barrel was subsequently placed in service extruding medical tubing of fluorinated ethylene propylene copolymer (FEP) with titanium nitride and barium sulphate and has performed without wear, corrosion, or product contamination. Previously best available barrels with centrifugal cast bore protection were replaced five times yearly and product contamination and degradation cut yield severely.

EXAMPLE 2

A twin-cylinder barrel 2.08" I.D. by 7.49" long was manufactured by means of the invention. A FIG. 8 mandrel was made by slicing axially and welding together two steel tubes with 0.350" wall thickness and with external diameters 0.004" undersized of the final bore I.D. The mandrel was sprayed, cleaned, ground, inserted in the house, sealed, evacuated and HIPped as in Example 1, except that a temperature of 1850° F. was used. A radial expansion of the mandrel of only 0.001" was caused and final coating density was essentially 100%. After finishing, the bore surface was completely protected and the apex angel between the two lobes were smooth and true. Hardness and composition were similar to those in Example 1.

EXAMPLE 3

Four small cylinders having an O.D. of 4.0, an I.D. of 1.750 and a length of 6.0 inches were manufactured having nickel-based liners obtained from the following ingredients.

|  | Wt. % |
| --- | --- |
| Carbon | 0.3 |
| Iron | 0.82 |
| Silicon | 4.60 |
| Boron | 3.35 |
| Nickel | Balance |

The liners were produced by initially spraying a mixture of the alloy ingredients onto the outside diameter of a low carbon alloy tube having dimensions that allow the "as-sprayed" tube to be inserted into a ferrous metal shell, i.e. 4140 steel housing. More specifically, the shell was pre-bored to a dimension sufficient to allow the alloy to be deposited at the desired final thickness. This was about 0.125 inch per side over the desired thickness, which was 0.060 inch. The inner tube was sprayed with the alloy to the desired thickness, ground to the proper size, and then inserted into the outer housing. A gap of about 0.125 inch existed between the outside diameter of the inner tube and the outside diameter of the outer tube.

After the unit was assembled, it was closed by welding caps on each end of the tube and thereby sealing the alloy ingredients made. A small evacuation tube was inserted into a cavity drilled through one of the end caps, and all of the air was removed by means of a vacuum pump. The sealed unit was next placed into a cold wall, internally heated pressure vessel and hot isostatically pressurized at 15,000 psi at a temperature of 1750° F. for three hours. The inner tube is then machined out.

Samples cut from the four small cylinders and metallographically examined revealed that a complete metallurgical bond had been formed between the alloy and the steel housing. The hardness of the nickel alloy liner was measured at 55–61 Rockwell C.

EXAMPLE 4

An extruder cylindrical barrel was manufactured from a 4140 steel housing was lined with an alloy prepared from the composition given below and utilizing the procedure of Example 1:

|  | Wt. % |
| --- | --- |
| Carbon | 0.25 |
| Iron | 0.82 |
| Silicon | 4.60 |
| Boron | 3.35 |
| Nickel | Balance |

The cylindrical barrel was employed in an extruder processing a fluorinated ethylene-propylene copolymer (FEP) to product medical tubing. After six weeks of continuous operations there was no material contamination whatsoever. When conventional anti-corrosive barrels, such as those described in U.S. Pat. Nos. 3,658,515 and 3,836,341 were employed, black specs began to appear in three weeks and the problem worsened thereafter.

The FEP tubing was extruded in single strands ranging from 0.028 to 0.085 inch in diameter. In addition to FEP resins, the feed formulation also contained 0.1% by weight titanium dioxide and 8.0% barium sulphate. To hold down extrusion pressure, maximum screw speed was 8 rpm. this resulted in a fairly long residence time of the resin in the barrel, which increased the risk of corrosive attack on the liner. Although the exact reasons why the special alloy of the present invention works so effectively in this highly corrosive environment are not fully understood at the present time, it is believed that the alloy's success may be due to its low iron content (less than 1%) and high nickel content (at least 80%).

It will be understood, however, that various changes and modifications may be made in the above-specified embodiments without departing from the broad scope of the present invention.

What is claimed is:

1. A method of reducing contamination of halogenated polymer resins by degenerated resin components during molding of the resins, comprising molding the resins in molding apparatus lined with a hard, wear resistant, corrosion resistant nickel-based alloy comprising major ingredients composed of 0.5 to 5% by weight silicon, 1 to 4% by weight boron, and nickel.

2. A method as claimed in claim 1, wherein the alloy further includes not more than 0.4% by weight of carbon.

3. A method as claimed in claim 1, wherein the alloy further includes not more than 10% by weight of chromium.

4. A method as claimed in claim 1, wherein the alloy has a hardness of from about 55–62 Rockwell C.

5. A method as claimed in claim 1, wherein the resin molding is selected from the group consisting of extrusion or injection molding.

6. A method as claimed in claim 1, wherein the resins are selected from the group consisting of plastic resins and rubber resins.

7. A method as claimed in claim 1, wherein the resins comprise halogenated copolymers.

8. A method as claimed in claim 7, wherein the halogenated copolymers include fluorohydrocarbons.

9. A method as claimed in claim 1, wherein the resins include sulphur.

10. A method as claimed in claim 1, wherein the halogenated polymers include fluorohydrocarbons.

11. A method as claimed in claim 1, wherein the alloy further includes not more than 1% by weight of iron.

* * * * *